United States Patent [19]
Lamb

[11] 3,906,989
[45] Sept. 23, 1975

[54] RESILIENT MATERIAL TAP VALVE WITH MAGNETIC CLOSURE ASSIST
[76] Inventor: Kay R. Lamb, 1105 Ridge Ave., Rockford, Ill. 61103
[22] Filed: Dec. 6, 1973
[21] Appl. No.: 410,981

[52] U.S. Cl. ............................. 137/320; 137/525.1
[51] Int. Cl.² ......................................... B65D 83/00
[58] Field of Search ........... 137/223, 315, 317, 320, 137/321, 322, 323, 329.1, 525, 525.1; 222/400.7; 217/99; 46/45, 236

[56] References Cited
UNITED STATES PATENTS

| | | |
|---|---|---|
| 2,526,629 | 10/1950 | Bourke .......................... 137/525.1 X |
| 2,537,585 | 1/1951 | Hilkemeier .................... 137/525.1 X |
| 2,830,611 | 4/1958 | Stelma ................................. 137/322 |
| 3,369,666 | 2/1968 | Hultgren et al. .............. 137/525.1 X |
| 3,653,557 | 4/1972 | Lamb .............................. 137/320 X |

*Primary Examiner*—Alan Cohan
*Attorney, Agent, or Firm*—Morsbach & Pillote

[57] ABSTRACT

This invention relates to a tap valve device formed of resilient material having opposed resilient lips engageable to close the passageway through the tap valve, and a permanent magnet means on the lips for magnetically biasing the lips to a closed position.

7 Claims, 8 Drawing Figures

RESILIENT MATERIAL TAP VALVE WITH MAGNETIC CLOSURE ASSIST

BACKGROUND OF THE INVENTION

Valve devices have heretofore been made from a resilient material with opposed lips adapted to close a passage through the valve. Some difficulties are encountered in obtaining a reliable closure of the lips of such valves and, in order to improve the reliability of such valves, it has heretofore been proposed to utilize spring type closure assists which engage the resilient lips of the valve to bias the valve toward a closed position. While such spring type closure assists do increase the closing force on the lips and improve reliability of closing of the valves, they also increase the force required to obtain full opening of the valve and produce an undesirable restriction to fluid flow through the valve. Moreover, resilient material type valves are sometimes used as tap valves for pressurized containers to seal around the tap tube. It is difficult to provide a spring type closure assist which will uniformly press the lips of the valve into face-to-face contact to close the valve, when the tube is withdrawn, and also allow the lips to curve and conform to the tap tube when it is inserted through the valve.

SUMMARY OF THE INVENTION

It is the object of the present invention to overcome the disadvantages of the prior art by providing a resilient material valve having opposed resilient lips engageable to close the passage through the valve and magnetic means on the lips for magnetically biasing the lips to a closed position. The magnetic biasing means on the lips applies a closing pressure which is generally uniform along the width of the lips to reliably press the lips into face-to-face engagement. Moreover, the closing force applied by the magnetic biasing means is a maximum when the lips are in abutting relation and decreases as the lips are separated. This minimizes restriction of flow through the valve when the valve is used as a one-way flow control valve and facilitates insertion of a draw tube or the like through the valve, when the valve is used as a tap valve for a pressurized container. Moreover, the resilient material valve with a magnetic closure assist affords some economies in manufacture over the spring biased valves.

These, together with other features and advantages of this invention will be more readily understood by reference to the following detailed description when taken in connection with the accompanying drawings wherein.

Figure 2:
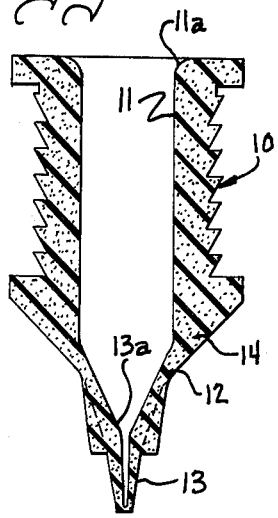
FIG. 2 is a longitudinal sectional view through a valve device embodying the present invention illustrating the same on a larger scale than FIG. 1.
Figure 3:
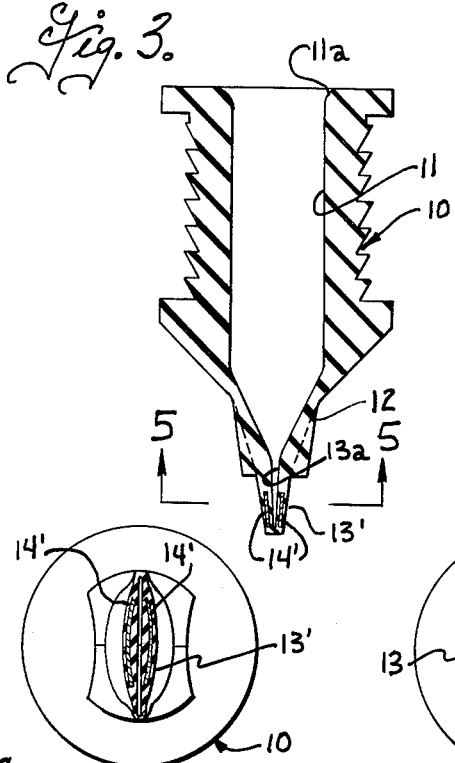
FIG. 3 is a longitudinal sectional view through a modified form of valve device, illustrating the same in a closed position.
Figure 4:
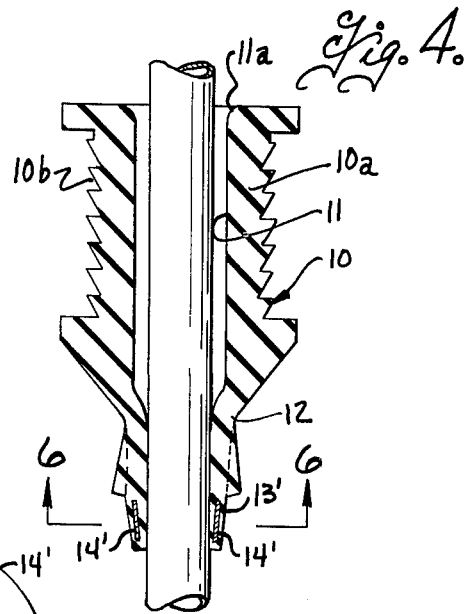
FIG. 4 is a longitudinal sectional view through the valve device of FIG. 3, illustrating the same in an open condition.
Figure 5:
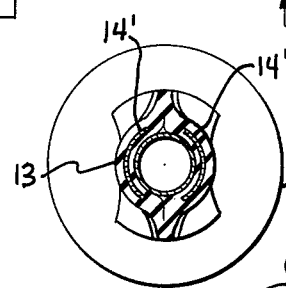
FIG. 5 is a transverse sectional view through the closure lips of the valve device of FIG. 3, taken on the plane 5—5 of FIG. 3.

The valve device of the present invention in general comprises a body 10 formed of a resilient and deformable material, preferably an elastomeric material such as natural or synthetic rubber, suitable plastic materials and the like. The body has a passage 11 extending therethrough which opens at 11a at one end of the body and an inwardly tapered portion 12 at its other end that terminates in opposed lips 13. The lips have opposed faces 13a that are engageable to form a fluid tight closure for the passage, and the valve is molded so that the lips are normally in abutting face-to-face relation as shown in FIGS. 2 and 3. The lips are adapted to open in response to internal pressure in the passage 11, caused either by fluid pressure or mechanical pressure as hereinafter described, to allow passage through the lips and to close to prevent return flow. The valve is thus adapted for use as a non-return valve to open for flow from the passage 11 and to close to prevent return flow and is also adapted for use as a tap valve to seal around a tap tube in a pressurized container. In accordance with the present invention, a magnetic means is provided for assisting closure of the valve lips. In the preferred embodiment of the invention illustrated in FIG. 2, the magnetic means comprises particulate permanent magnetic material indicated by the numeral 14 in FIG. 2, dispersed in the resilient deformable material throughout the body 10 including the lip portions 13. The permanent magnetic material utilized can be of various known materials of a type capable of being produced in a particulate state, for example barium or strontium ferrite, and the permanent magnetic material can be powdered or crystalline form depending on the material and manner of production. The particulate permanent magnetic material is mixed with the resilient material of the body prior to molding and, during the molding operation, or thereafter, at least the lip portions of the body are subjected to a magnetic field to polarize the magnetic material in the lip portions in a direction transverse to the opposed face 13a of the lips so that the magnetic material biases the lips toward a closed position. The resilient deformable material of the body thus forms a matrix to suspend the particles of permanent magnet material and allows the lip portions to expand and contract as required to open and close the valve.

A modified form of magnetic assist is illustrated in FIGS. 3–6 and includes magnetic elements designated 14' embedded in the lip portions 13' of the valve. Both magnetic elements can advantageously be in the form of thin strip type permanent magnets formed from particulate permanent magnet material in a resilient matrix or binder such as rubber, and the permanent magnet elements are polarized, preferably after molding of the body, in a direction transverse to the sealing faces of the lips to magnetically attract the lips into face-to-face engagement. Alternatively, a strip type permanent magnet element can be utilized in one of the lips 13' while a non-retentive ferromagnetic material can be used to form the magnetic element 14' in the other lips. The non-retentive ferromagnetic element can either be in the form of a thin flexible strip or strips of iron or steel having a thickness in the order of one thousandths of an inch or of a thin flexible strip formed of non-retentive ferromagnetic powder embedded in a resilient matrix such as rubber or the like.

Figure 7:
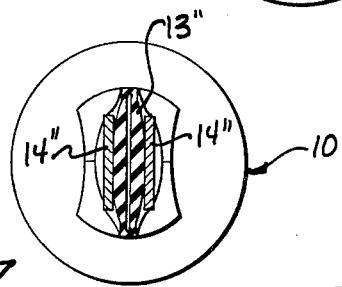
FIG. 7 is a fragmentary sectional view through the closure lips of a further modified form of valve device illustrating the valve in a closed condition.
Figures 6, 8:
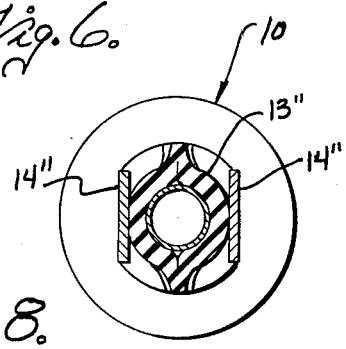
FIG. 6 is a fragmentary sectional view through the closure lips of the valve device of FIG. 3, taken on the plane 6—6 of FIG. 4.
FIG. 8 is a sectional view through the lips of the valve device of FIG. 7, illustrating the same in an open condition.

Still another form of magnetic biasing means is illustrated in FIGS. 7 and 8. In this embodiment, the magnetic means designated 14'' is in the form of relatively rigid magnetic elements affixed as by a resilient adhesive or bonding agent to the outer faces of the lips 13. Both magnetic elements 14'' can be of permanent magnet material or, alternatively, one can be of a permanent magnet material and the other of a non-retentive ferromagnetic material. As best shown in FIG. 8, the rigid type magnets are affixed at only localized areas to the outer faces of the lips so that the lips are free to distend to a non-planar or curvilinear form when open, without substantial restraint from the magnetic elements affixed to the outer faces.

Figure 1:
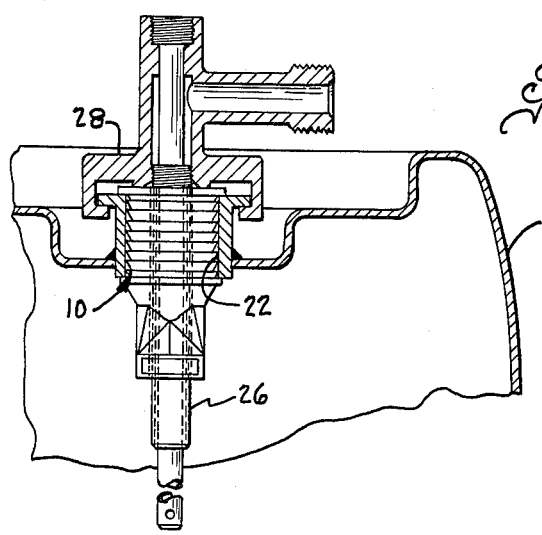
FIG. 1 is a fragmentary sectional view through a keg with a tap valve constructed in accordance with the present invention applied thereto for sealing the tap head to the keg.

The resilient material valve with a magnetic closure assist for the lips is generally adapted for use as a one-way or non-return valve and may be utilized in flow conduits as a non-return valve or on containers to control flow of fluid either to or from the container. The valve device with magnetic closure assist, however, is particularly adapted for use as a tap valve for sealing the tap tube of a tapping head to a pressurized container such as a keg. The valve 10 is shown in FIG. 1 inserted in the tap opening 22 of a keg 21 to seal around the tap tube 26 of a tap head 28, when the tap head is installed on the keg, and to seal the tap opening in the keg, when the tap head and tube are removed. The valve body 10, when used as a tap valve, is formed with a preferably thickened annular body portion 10a which is dimensioned to extend into the tap opening 22 to form a fluid type seal therewith. As shown, the outer periphery of the body portion 10a is preferably grooved or fluted to provide a labyrinth type seal between the valve body and keg. The tap valve is normally closed to seal the pressurized keg and is constructed and arranged to receive the tap tube or tubes 26 of the tap head 28, for use in dispensing the contents of the keg. In the embodiment illustrated, the tap head 28 has concentric outer and inner tap tubes 26, 26a for respectively passing gas such as pressurized carbon dioxide to the keg and liquid from the keg. The tap valve is arranged to open upon insertion of the tap tubes through the passage 11a and allow the tap tubes to enter the keg and to seal the interface between the keg and the tap tubes. If it is desired to minimize the drag or resistance to passage of the tap tubes through the lips, the tap tubes can be formed of a non-magnetic material. On the other hand, if it is desired to improve the seal between the lips and the tap tube, the tap tube, at least the outer tube 28b can be formed of a ferromagnetic material so that the permanent magnetic means in the lips are attracted to the tube to aid in sealing the interface therebetween.

I claim:

1. A keg tapping apparatus including a tap head having a draft tube, a tap valve for use in the tap opening of the keg comprising a body formed of a resilient deformable material having a passage extending therethrough and opening at one end of the body and dimensioned to allow insertion of the draft tube therethrough, the body having means on its outer periphery for sealingly engaging a tap opening in a keg and an inwardly tapered portion at the other end terminating in a pair of thin flexible lips, the lips having opposed faces engageable to form a liquid tight closure for said passage and being separable upon insertion of the draft tube through the passage and engageable with the outer wall of the draft tube to form a seal therewith, and magnetic means on each of the lips of said pair of lips for magnetically attracting said lips into face-to-face engagement, said magnetic means including permanent magnet means on at least one lip of said pair polarized to magnetically attract the magnetic means on the other lip of said pair, said draft tube being formed of a non-magnetic material so that the magnetic means on the lips are not magnetically attractive to the draft tube whereby to minimize resistance to insertion and removal of the draft tube from the tap valve.

2. A keg tapping apparatus according to claim 1 wherein said magnetic means comprises particulate magnetic material dispersed in the resilient deformable material in the lips of said body and polarized in a direction transverse to said opposed faces of said lips.

3. A keg tapping apparatus according to claim 1 wherein said magnetic means comprises particulate magnetic material dispersed in the resilient deformable material throughout said body including said pair of lips with the permanent magnet material in the lips polarized in a direction transverse to said opposed faces of said lips.

4. A keg tapping apparatus according to claim 1 wherein said magnetic means comprises a flexible permanent magnet element embedded in each of the lips of said body.

5. A keg tapping apparatus according to claim 1 wherein said magnetic means comprise permanent magnet means on each of the lips of said pair polarized to have adjacent face areas of the magnetic means of opposite polarity.

6. A keg tapping apparatus according to claim 1 wherein said magnetic means comprises a permanent magnet element on one of the lips and a non-retentive ferromagnetic element on the other of said lips.

7. A keg tapping apparatus according to claim 1 wherein said magnetic means comprises magnetic elements affixed to the outer faces of said lips.

* * * * *